United States Patent
Pierre et al.

(10) Patent No.: US 6,654,810 B1
(45) Date of Patent: Nov. 25, 2003

(54) PROCESS FOR OPTIMIZING DATA TRANSFER BETWEEN A CLIENT APPLICATION AND A SERVER IN A COMPUTER SYSTEM

(75) Inventors: Andrei Pierre, Paris (FR); Bui-Xuan Hoan, Paris (FR)

(73) Assignee: Bull S.A., Les Clayes-sous-Bois (FR)

( * ) Notice: Subject to any disclaimer, the term of this patent is extended or adjusted under 35 U.S.C. 154(b) by 0 days.

(21) Appl. No.: 09/573,566

(22) Filed: May 19, 2000

(30) Foreign Application Priority Data

May 19, 1999 (FR) .............................................. 99 06354

(51) Int. Cl.[7] .............................................. G06F 15/16
(52) U.S. Cl. ........................ 709/232; 709/234; 709/235
(58) Field of Search ................................ 709/232, 234, 709/235

(56) References Cited

U.S. PATENT DOCUMENTS

| | | | | |
|---|---|---|---|---|
| 5,499,364 A | * | 3/1996 | Klein et al. ................. | 709/202 |
| 5,598,532 A | * | 1/1997 | Liron ............................ | 703/2 |
| 5,826,253 A | * | 10/1998 | Bredenberg .................... | 707/2 |
| 5,913,028 A | * | 6/1999 | Wang et al. ................. | 709/203 |
| 6,006,264 A | * | 12/1999 | Colby et al. ................. | 709/226 |
| 6,104,392 A | * | 8/2000 | Shaw et al. .................. | 345/749 |
| 6,292,827 B1 | * | 9/2001 | Raz ............................. | 709/217 |

OTHER PUBLICATIONS

Apostolopoulos T K et al: "Temporal Network Management Model–Concepts and Implementation Issues" Computer Communications, NL. Elsevier Science Publishers BV, Amsterdam, vol. 20, No. 8, Aug. 25, 1997 pp. 694–708, XP004126722, ISSN: 0140-3664 p. 694, lefthand col. line 20—p. 695, lefthand col, line 4, Fig. 1 p. 698, righthand col, line 8—p. 700, righthand col. line 14 p. 700, righthand col., line 14 p. 702, righthand col., line 11–line 19 p. 705, righthand col., line 11–last line.

Anonymous: "Change–Notification Service for Shared Files" IBM Tech. Disclosure Bulletin, US, IBM Corp. NY, vol. 36, No. 8, Aug. 1993 (1193-08) pp. 77–82-82, XP002108713, ISSN: 0018-8689 Entire Document.

\* cited by examiner

*Primary Examiner*—Krisna Lim
(74) *Attorney, Agent, or Firm*—Edward J. Kondracki; Miles & Stockbridge P.C.

(57) ABSTRACT

The subject of the present invention is a process for optimizing the flow of data between at least one client application and at least one request management system that includes at least one object having states and values capable of being modified wherein the client application sends at least two successive requests for interrogating states or values of objects included in a management system. Communication between the client application and the management system takes place through a communication system. The process is characterized in that on initialization, the management system transmits to the client application, at the request of the client application, a set of objects that includes all or some of the objects included in the management system. In response to an interrogation request from the client application, the management system transmits to the client application any modifications that include the states and/or values of at least one object of this set that have been modified. Another interrogation request from the client application is transmitted after a given time lapse (T), giving the client application at least the ability to finish processing the response to the first request.

16 Claims, 2 Drawing Sheets

PROCESS FOR OPTIMIZING DATA TRANSFER BETWEEN A CLIENT APPLICATION AND A SERVER IN A COMPUTER SYSTEM

TECHNICAL FIELD

The subject of the present invention is a process for optimizing the transfer of data between at least one client and at least one server in a computer system. The computer system may or may not be heterogeneous, and may or may not be distributed.

BACKGROUND OF THE INVENTION

By definition, an application is said to be designed based on a "client/server" architecture when it is composed of two independent programs that cooperate with one another to perform the same operation, each running in a specific environment (machine, operating system), a programming interface using a language constituted by commands making it possible to control their dialog.

Also, in a client/server architecture, clients and servers coexist and dialog in the form of requests. A client application generally means a program that receives the data sent by a user and submits this data in request form to another program associated with a server. In other words, a request passes from a client application to a management system that offers the service requested. This service offers a processing service corresponding to the request sent. In general, the processing includes a read access or an update to a base known to one skilled in the art.

The client/server mode has the advantage of allowing a user (for example of a simple microcomputer) called a client to consign part of his job or his operations to be performed to a server. Thus, the client has access to a computing capacity much greater than that of his own microcomputer. Likewise, a client application can address a specialized server and efficiently outsource an operation, the server having optimal operating conditions and capabilities because of its specialization.

In this computer system, a management system particularly well adapted to the invention can be a system for managing the machines of a computer system such as OPENMASTER (a registered trademark of the company BULL S.A.).

This system uses standardized CMIS (Common Management Information Services), known to one skilled in the art. This management system may be likened to a set of services that interact with one another to provide a virtual representation of the real world that is the computer system. It is a virtual representation that an administrator manipulates (supervision, action) in order to manage the real world. The virtual representation deals with virtual objects of the real world and constitutes an object model. This virtual representation is embodied by a containment tree. The invention is not limited to this type of server, and is applicable to any request server.

In this OPENMASTER type of system, the transfer of data takes place between a client machine and at least one machine of the request server type, called a management system. The term "management" will be used in accordance with the AFNOR (French Association for Standardization) translation of the French term "gestion." The machines are connected to one another through a LAN (Local Area Network), WAN (Wide Area Network), Lot or Internet. This system may or may not be distributed, and may or may not be heterogeneous.

Management systems can maintain hierarchical relationships. Thus one management system may be subordinate to another management system.

A distributed system is computer system environment that runs on at least two identical or different operating systems. A machine is associated with an operating system. A machine comprises at least one physical resource (for example networks, concentrators, segments, etc.) or logical resource (for example a database, etc.). A heterogeneous computer system generally contains a variety of management protocols. In this system, each machine is associated with at least one management protocol.

The client application is included in a client machine that can be, for example, a workstation, a personal computer, etc. Hereinafter, the client will be represented by a workstation.

The tree comprises in its nodes all of the objects managed by the management system. By definition, a managed object is an abstract view, defined for the purpose of managing a logical or physical resource of a system. An attribute is a characteristic of a managed object that has a named type and a value. The value of an attribute of an object can be consulted or modified by a request addressed to the object.

In a computer system of the OPENMASTER type, at least one agent is generally located in a machine of the computer system. An agent processes requests that are addressed to it. A software agent manages and updates data in the machine in which it is located in another containment tree. Each agent can support a protocol such as the protocol SNMP (Simple Network Management Protocol), the protocol CMIP (Common Management Information Protocol), the protocol DSAC (Distributed Systems Administration and Control) or other protocols.

The management system also comprises several agents, equal in number to the management protocols existing in the computer system. The agents included in the management system are generally named "integrating agents" in that they are integrated into the management system. The agents and the integrating agents of the management system(s) coexist and communicate so as to mask the heterogeneity of the network.

THE PRIOR ART

In a computer architecture of the client/server type, the values or the states of objects that are managed and updated in the management system are transmitted to the client applications. Thus, a client application included in this machine can be informed of the changes in the values or states of these objects, display them, and perform actions.

Between (one or) several client applications and a management system, there is a flow of information constituted by values and states of objects managed by the management system. The client application must be updated with these object states and values in order to react quickly and efficiently. However, in the case where the client application uses a large number of values and states of objects of the management system, the flow of data between the management system and the client application can be very high and can not only lead to an overflow in the client application, but can also saturate the communication system between the client applications and the management system.

A first solution consists in that the management system, for each object requested by a client application, sends this client the state or the value of the object. Thus, when the management system detects a change in the state or value of an object, it sends this state or value of the object to the client application(s) interested in this object. The big problem is that if the number of objects is very high, the flow of data between the management system and the client application can also be very high and runs the risk of overflowing the client application and the communication system between the management system and the client applications.

A second solution consists in that the management system sends the client application not just one object value or state, but the values or states corresponding to a set of objects. The management system sends these values or states at regular intervals, for example every n seconds, and when at least one object has changed its state or value. This solution does not take into account the activity level of the client application. Thus, a client application that is saturated can receive a set of object values every n seconds without being able to process them.

A third solution consists in that the client application sends requests on each of the objects at regular intervals, for example every n seconds, in order to learn the state of the objects managed by the management system. The problem is that if the number of objects is high, the number of requests to the management system will be high, and consequently the flow of data between the client application and the management system will be high. Another problem is that this solution does not take into account the overflow of the client application. In fact, a large number of requests can be sent without allowing for the requests that are currently being processed in the client application.

THE INVENTION

A first object is to be able to efficiently transfer to the clients the changes in the values or states of objects managed in a management system while taking care not to overflow the client application and the communication system between the management system and the client application.

A second object is to provide the system with a simple and general communication process between the management system and the client application.

To this end, the subject of the invention is a process for optimizing the flow of data between at least one client application and at least one request management system that includes at least one object having states and values capable of being modified, said client application sending at least two requests for interrogating states or values of objects included in a management system, the communication between a client application and a management system taking place through a communication system characterized in that on initialization, the management system transmits to the client application, at the request of the client application, a set of objects that includes all or some of the objects included in the management system, and in response to an interrogation request from the client application, the management system transmits to the client application any modifications that include the states and/or values of at least one object of this set that have been modified, another interrogation request from the client application being transmitted after a time lapse, giving the client application at least the ability to finish processing the response to the first request.

BRIEF DESCRIPTION OF THE DRAWINGS

The invention will be better understood through the reading of the following description given as an example in reference to the attached drawings:

In the drawings:

In order to simplify the description, in the drawings the same elements have the same references.

DESCRIPTION OF THE PREFERRED EMBODIMENTS

Figure 1:
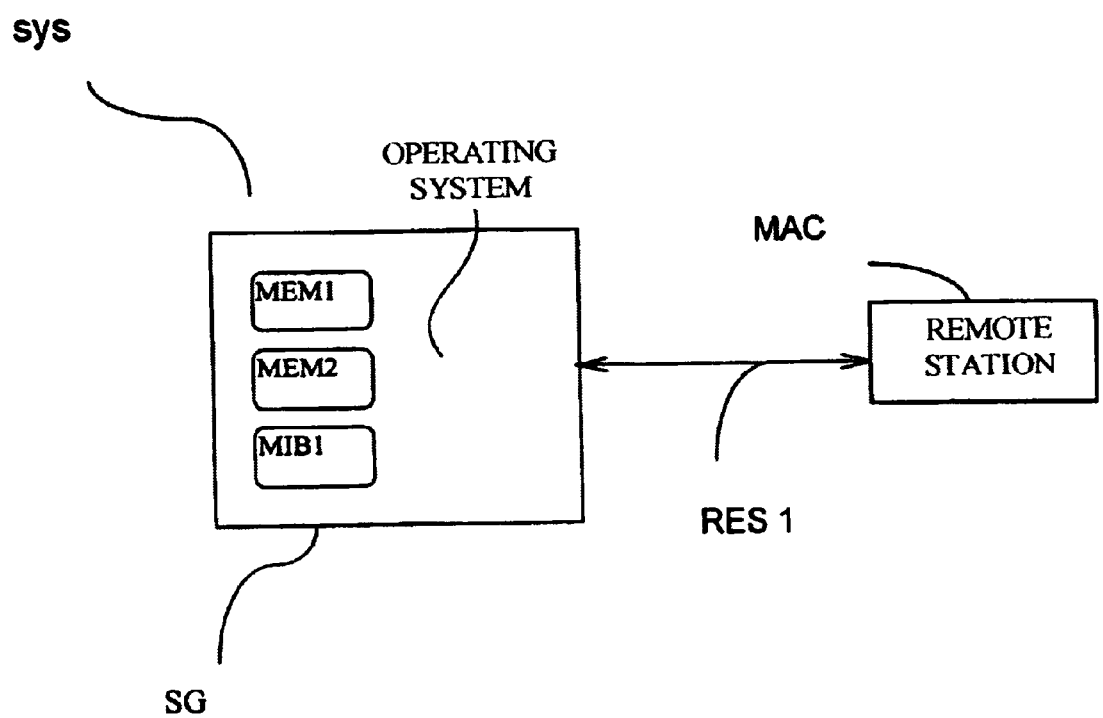
Figure 2:
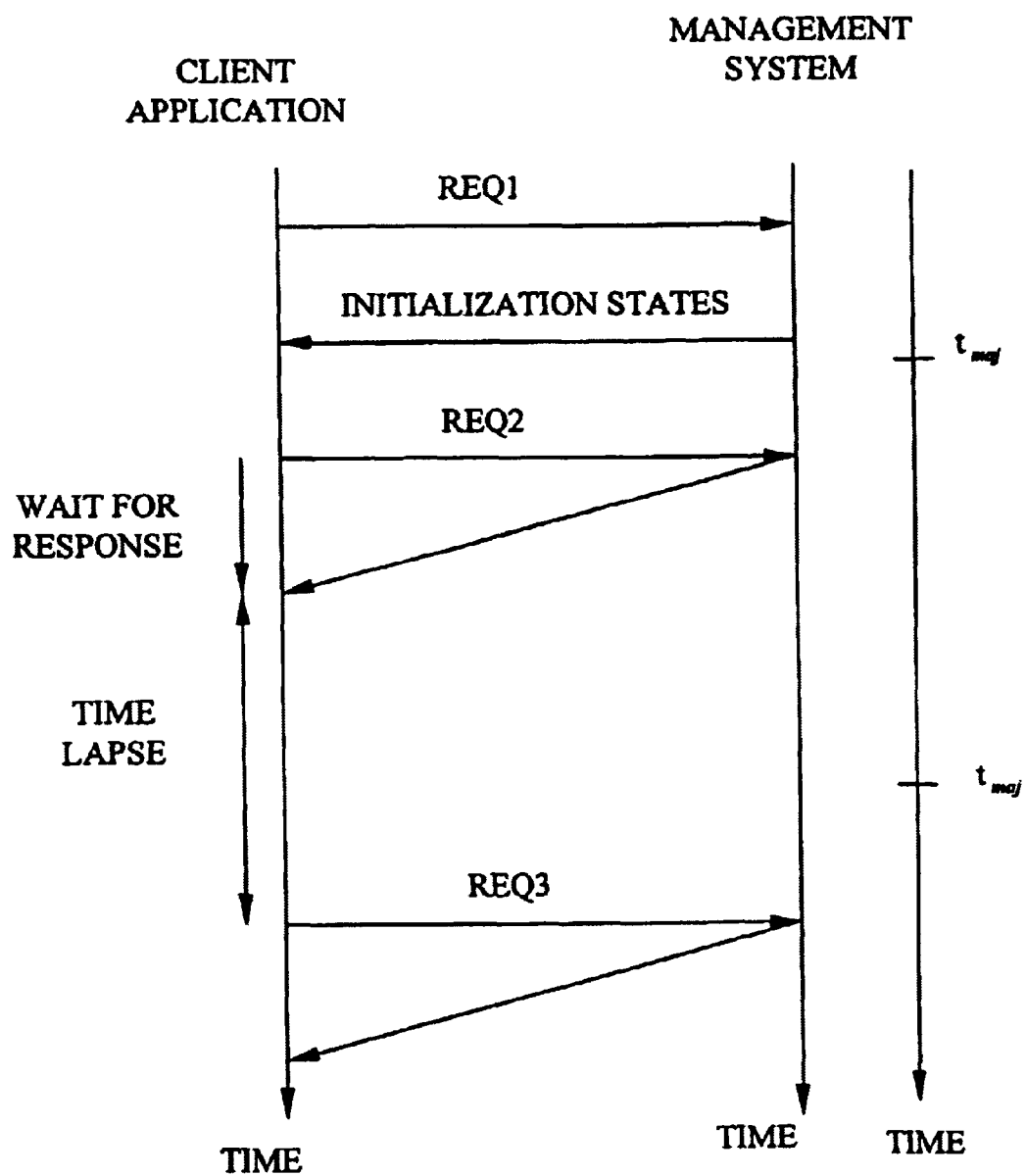

FIG. 1 is a block diagram of the architecture of a computer system to which the present solution can be applied;

FIG. 2 is a schematic view of the flow of information between a client application and a management system.

FIG. 1 represents a computer system SYS with a distributed environment of the heterogenous type. In the example illustrated, this system SYS includes at least one OpenMaster operating system SG, and at least one remote station MAC, for example of the JAVA type. Preferably this JAVA station is a Windows NT machine equipped with a standard navigator called "Internet Explorer," known to one skilled in the art. Programs in JAVA language, called "applets," are loaded and run on this station. The utilization of this type of station offers the user the advantage of a well known machine interface. This client station includes a client application.

The system comprises at least one processor PRO and storage means MEM assigned to the workstation and to the management system SG.

In the exemplary embodiment, the management system SG supports services of the CMIS (Common Management Information Services) type, standardized in accordance with the OSI model known to one skilled in the art.

The management system SG also comprises at least one integrating agent associated with a management protocol in order to mask the heterogeneity of the computer system. An integrating agent is a software agent.

Naturally, the management system SG can comprise several integrating agents. The integrating agent AI1 is linked to an agent of the same type located in the station through a network RES1. The network RES1 can be a LAN (Local Area Network), a WAN (Wide Area Network) or Internet. A set of software layers is interposed between the management system SG and the network RES1, and between the network RES1 and the station MAC. This set of software layers is based on the OSI (Open Systems Interconnection) model of layered architecture of the ISO (International Organization for Standardization), known to one skilled in the art. In order to simplify the description, this set of software layers is not represented in FIG. 1.

The management system SG also comprises a containment tree MIB1 managed by the integrating agent. In the example illustrated, the tree MIB1 comprises n objects OBJ1–OBJn, each including properties comprising values and states capable of being modified over time as a result of requests or operations on these objects. The properties of an object are specifically defined by:

at least one attribute at least one action that this object can execute the behavior of this object in response to external accesses at least one notification that the object must send in order to report events.

In network and systems management, a set of operators included in the client application monitors computer resources (machines, routers, printers, etc.) through a graphical application included in the station, which represents the state of these resources. The states or the values characterizing these resources are stored in the management system. The graphical application makes it possible to display the objects OBJ1–OBJ3. The graphical application used by the operator can be, for example, a client application that will request the states and the values of objects from the management system.

The tree MIB1 provides a virtual representation of the real world that surrounds the management system SG. It is a virtual representation that the user UT or the administrator manipulates (supervision, action) in order to manage the real world. The virtual representation deals with virtual objects of the real world and constitutes an object model. In the example illustrated, the real world is embodied by machines (not represented in the surrounding figure) such as the station MAC.

Several manipulations can be applied to the attributes. The operations include the commands << get attribute value >> or << replace attribute value>>. Likewise, operations can be applied to objects. The operations can be of the following types:

<< Create>> to create an object of a class

<< Delete>> to request a managed object to destroy itself

<< Action>> to request an object to execute an action specified in the definition of the class.

The result of this set of manipulations is to modify the state and/or the values of the objects. To this end, a service included in the management system has the function of updating the containment tree. Preferably, this updating is performed at given instants $t_{maj}$, and at regular intervals.

The problem, as mentioned in the introduction to the specification, is that the flow of data between the management system SG and the client application can be very high, and the risk of overflowing the client application and the communication system is high.

The subject of one solution to this problem is a process for optimizing the data flow. According to this process, on initialization, the management system transmits to the client application, at the request of the client application, a set of objects that includes all or some of the objects included in the management system, and in response to an interrogation request from the client application, the management system transmits to the client application any modifications that include the states and/or values of at least one object of this set that have been modified.

another interrogation request from the client application being transmitted after a time lapse, giving the client application at least the ability to finish processing the response to the first request.

The flow is optimized in the sense that the client application is in control of the dialog between itself and the management system. In other words, the management system only sends responses only at the request of the client application.

In our exemplary embodiment, the process of invention comprises the following initialization steps:

Step 1:

During a first initialization step, a user of the client application sends a specific request REQ1 to inform the management system SG of the list of objects it is using from among the set of existing objects of the containment tree MIB1. In the example illustrated, the client application uses the objects OBJ1, OBJ2, OBJ3 from among n objects of the containment tree MIB1.

Step 2:

The management system stores this information in any memory MEM1.

Step 3:

The management system transmits the list of objects requested by the client application as well as the states and values of these objects. The states of these objects sent on initialization are defined as being the initialization states.

Beginning with the transmission of the initialization states, the service included in the management system continuously monitors the states and values of the objects OBJ1–OBJ3 and detects any change in state and/or value of these objects in the various machines of the network in order to update the containment tree MIB1 associated with it. If a change in the state or value of an object is detected between two requests from the client application, the management system extracts the object affected by a state change and stores it in a memory MEM2, for example a buffer memory. Generally, the memory MEM2 stores all the objects whose states and/or values have changed between two requests.

This way, the client application can send only one request to the management system SG requesting the states and the values of the modified objects, the management system transmitting only the objects present in the memory MEM2. Let it be noted that the request REQ2 sent by the client application does not involve the state or the value of just one object but of a set of objects. The client application receives all the values and states of the objects that have been modified and can update its database with the new values of the objects whose values and states have been modified. This update requires a time called a refresh time for updating the graphical application with the objects that have been modified.

The client application therefore sends only one interrogation request to the management system, asking it for all the values of objects whose states have changed since the last request received by the management system.

Moreover, from the moment the management system receives an interrogation request from the client application, the management system immediately sends the modified objects that are located in the memory MEM2.

After having sent a request REQ2, the client application waits for the response from the management system, completely processes the response included within a time lapse T and sends a new request REQ3 to the management system, thus preventing an overflow of the client application.

Moreover, storing the objects whose states and/or values have been modified in a buffer memory MEM2 gives the system the ability to respond to the application within a time lapse R much shorter than the time lapse T required for the processing of a response by the client application. The time lapse R will be even shorter if the network RES1 is a high-speed transmission network.

According to the invention, the time lapse T is determined at the level of the client application.

The duration of the time lapse T corresponds to at least the processing time of the response issued by the management system, including the time for refreshing the graphical application with the objects that have been modified.

According to a preferred variant of the invention, if the time interval between the update instants $t_{maj}$ in the server is long compared to the wait for a response and to the time lapse, the time lapse T can also comprise an arbitrary time lapse called an adjustment time. This adjustment time allows the client application to finish any task independent of the request currently being processed.

According to another variant, for example if the time interval between the update instants $t_{maj}$ in the server is short compared to the wait for a response and to the time lapse, the duration of the time lapse set is preferably equal to the time for the processing of the response by the client application.

According to another variant, the duration of the time lapse can be set by an operator of the client application as a function of the maximum number of objects that can pass between the client application and the management system.

Generally, the subject of the present invention is a process for optimizing the flow of data between at least one client application and at least one request management system that includes at least one object having states and values capable of being modified, said client application sending at least two successive requests for interrogating states or values of objects included in a management system, the communication between a client application and a management system taking place through a communication system. The process is characterized in that on initialization, the management system transmits to the client application, at the request of the client application, a set of objects that includes all or some of the objects included in the management system, and in response to an interrogation request from the client application, the management system transmits to the client application any modifications that include the states and/or values of at least one object of this set that have been modified, another interrogation request from the client application being transmitted after a given time lapse T, giving the client application at least the ability to finish processing the response to the first request.

It may be seen that the client application is in control of the dialog between itself and the management system and that the management system responds only at the request of the client application. Advantageously, the client application sends only one interrogation request to the management system, asking it for all the values of objects whose states have changed since the last request received by the management system.

We have seen in our example that the management system stores in at least one memory a list of the objects of the management system that includes at least one of the objects whose respective states and/or values have been modified between two requests from the client application, and that when a request from the client application is sent, the management system responds with this list of values or states that have changed.

Preferably, on initialization, the set of objects that includes all or some of the objects included in the management system sent by the management system to the client application corresponds to the objects that the client application selects in the management system during initialization.

The time lapse T can consist in an automatic adjustment time that allows the client application to finish processing the response to the first request and to finish other tasks that are not linked to the processing of this response. It consists of initiating the second request in such a way that the processing of the response linked to this second request is done after the processing of the first response associated with the first request.

According to a variant, if the time interval between the update instants $t_{maj}$ of the containment tree in the server is short compared to the wait for a response and to the time lapse T, the duration of the time lapse set is equal to the time for the processing of the response by the client application.

It is therefore clear that the invention offers many advantages. In only one request, the client application can have all of the values or states of the objects that have changed. The utilization of the communication system between the client application and the management system is therefore optimized. This invention results in an improvement in the polling which, on the client end, consists of automatically adjusting the flow of data between the management system and the client application, and on the management system end, of optimizing the quantity of data sent to the client application through storage in a memory MEM2.

The wait for a response before the sending of another request allows an automatic adjustment, preventing the client application from being overrun by too high a flow of responses to the interrogation requests. The present invention is simple, general, and allows for easy implementation in a client/server architecture. It optimizes the number of data transfers between the client application and the management system, and thus makes it possible to avoid an overflow in the client application through its automatic adjustment.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claim.

What is claimed is:

1. A process for optimizing the flow of data between at least one client application and at least one request management system that includes at least one object having states and values capable of being modified, said client application sending at least two successive first and second requests for interrogating object states or object values included in the management system, the communication between a client application and the management system taking place through a communication system, comprising the steps of:

on initialization, transmitting by the management system to the client application, at the request of the client application, a set of objects that includes all or some of the objects included in the management system, and transmitting by the management system to the client application, in response to an interrogation request from the client application, any modifications that include the states and/or values of at least one object of said set of objects that have been modified, and transmitting another interrogation request from the client application after a given time lapse (T), so that the client application has the ability to finish processing a response to a first request.

2. A process according to claim 1, further comprising controlling dialog between the client application and the management system by the client application responding by the management system only at the request of the client application.

3. A process according to claim 1, further comprising sending an interrogation request to the management system, said interrogation request asking the management system for all the values of objects whose states have changed since a last request received by the management system.

4. A process according to claim 2, further comprising sending an interrogation request to the management system, said interrogation request asking the management system for all the values of objects whose states have changed since a last request received by the management system.

5. A process according to claim 1, comprising including storing in at least one memory of the management system a list of the objects of the management system that includes at least the objects whose respective states and/or values have been modified between two requests from the client application, and, in response to a request from the client application, responding by the management system with the list of values or states that have changed.

6. A process according to claim 2, further comprising storing in at least one memory of the management system a list of the objects of the management system that includes at least the objects whose respective states and/or values have been modified between two requests from the client application, and, in response to a request from the client application, responding by the management system with the list of values or states that have changed.

7. A process according to claim 3, further comprising storing in at least one memory of the management system a list of the objects of the management system that includes at least the objects whose respective states and/or values have been modified between two requests from the client application, and, in response to a request from the client application, responding by the management system with the list of values or states that have changed.

8. A process according to claim 4, further comprising storing in at least one memory of the management system a list of the objects of the management system that includes at least the objects whose respective states and/or values have been modified between two requests from the client application, and, in response to a request from the client application, responding by the management system with the list of values or states that have changed.

9. A process according to claim 1, characterized in that, on initialization, the set of objects that includes all or some of the objects included in the management system sent by the management system to the client application corresponds to the objects that the client application selects in the management system during initialization.

10. A process according to claim 1, characterized in that it consists of initiating a second request of two successive requests in such a way that the processing of the response linked to said second request is done after the processing of the first response associated with a first request.

11. A process according to claim 1, further comprising a time lapse (T) that consists in an automatic adjustment time that allows the client application to finish processing of the response to a first request and to finish other tasks that are not linked to the processing of the response to the first request.

12. A process according to claim 1, characterized in that, if a time interval between update instants $t_{maj}$ of a containment tree in a server is short compared to a wait for a response and to a time lapse (T), the duration of the time lapse is set to be equal to the time for processing of a response by the client application.

13. A process according to claim 2, characterized in that, if a time interval between update instants $t_{maj}$ of a containment tree in a server is short compared to a wait for a response and to a time lapse (T), the duration of the time lapse is set to be equal to the time for processing of a response by the client application.

14. A process according to claim 3, characterized in that, if a time interval between update instants $t_{maj}$ of a containment tree in a server is short compared to a wait for a response and to a time lapse (T), the duration of the time lapse is set to be equal to the time for processing of a response by the client application.

15. A process according to claim 4, characterized in that, if a time interval between update instants $t_{maj}$ of a containment tree in a server is short compared to a wait for a response and to a time lapse (T), the duration of the time lapse is set to be equal to the time for processing of a response by the client application.

16. A process according to claim 5, characterized in that, if a time interval between update instants $t_{maj}$ of a containment tree in a server is short compared to a wait for a response and to a time lapse (T), the duration of the time lapse is set to be equal to the time for processing of the response by the client application.

* * * * *